(12) United States Patent
Numajiri (10) Patent No.: US 8,247,916 B2
(45) Date of Patent: Aug. 21, 2012

(54) WIND TURBINE GENERATOR

(75) Inventor: Tomohiro Numajiri, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 15 days.

(21) Appl. No.: 12/739,008

(22) PCT Filed: Jan. 29, 2010

(86) PCT No.: PCT/JP2010/051194
§ 371 (c)(1),
(2), (4) Date: Aug. 26, 2010

(87) PCT Pub. No.: WO2011/092834
PCT Pub. Date: Aug. 4, 2011

(65) Prior Publication Data
US 2011/0278996 A1    Nov. 17, 2011

(51) Int. Cl.
*F03D 9/00* (2006.01)
(52) U.S. Cl. ............................ 290/44; 290/55
(58) Field of Classification Search ............... 310/115, 310/75 R, 90, 91, 112–114; 290/44, 55, 290/45
See application file for complete search history.

(56) References Cited

U.S. PATENT DOCUMENTS 6,911,741 B2 * 6/2005 Pettersen et al. ............... 290/44

FOREIGN PATENT DOCUMENTS

| EP | 1327073 B1 | 12/2007 |
|---|---|---|
| EP | 2014917 A1 | 1/2009 |
| JP | 55-64862 | 5/1980 |
| JP | 58-136945 | 9/1983 |
| JP | 60-31513 | 3/1985 |
| JP | 5-3689 | 1/1993 |
| JP | 6-24370 | 3/1994 |
| JP | 2004-511723 | 4/2004 |

OTHER PUBLICATIONS

Office Action issued in corresponding Australian application No. 2010201565 on Jan. 21, 2011.
Search Report and Written Opinion from corresponding application No. PCT/JP2010/051194 mailed Mar. 2, 2010.
English translation of relevant portion of Written Opinion in compliance with requirements to submit a concise of explanation of relevance.

* cited by examiner

*Primary Examiner* — Dang Le
(74) *Attorney, Agent, or Firm* — Kanesaka Berner & Partners, LLP

(57) ABSTRACT

A wind turbine generator is provided with a generator which is provided with a stator and a stator casing accommodating a generator rotor and the stator; a main shaft having one end coupled to a wind turbine rotor and the other end coupled to the generator rotor; a first bearing which rotatably supports the main shaft; a second bearing which is provided on the main shaft to support the stator casing such that the main shaft and the stator casing are rotatable relative to each other; a base to which the first bearing is attached; and a torque support including a coupling member which couples the base portion and a front plate of the stator casing. The load center of force acting between the coupling member and the front plate in a case that torque acts on the stator casing in the circumferential direction of the main shaft is positioned in a range between the front and back surfaces of the front plate.

9 Claims, 11 Drawing Sheets

WIND TURBINE GENERATOR

RELATED APPLICATIONS

The present application is a National Phase of, and claims priority from, International Application Number PCT/JP2010/051194, filed Jan. 29, 2010, the disclosure of which is hereby incorporated by reference herein in its entirety.

TECHNICAL FIELD

The present invention relates to a wind turbine generator, in particular to a generator supporting structure in a wind turbine generator.

BACKGROUND ART

A direct drive wind turbine generator is a wind turbine generator in which a main shaft transmitting rotation of the wind turbine rotor directly rotates the generator rotor within the generator. In an ordinary wind turbine generator, the rotation frequency of the wind turbine rotor is lower than the frequency of the utility grid, and therefore a gear box is used.

In a direct drive wind turbine generator of the system, on the other hand, the main shaft joined to the wind turbine rotor is directly connected to the generator without using a speed-up gear, and the size of the generator tends to be increased in the wind turbine generator of this type. This is because the rotation frequency of the wind turbine rotor does not match with the frequency of the utility grid and therefore the number of poles of field magnets within the generator must be increased. When the number of poles of the field magnets is increased, the diameter of the generator rotor is also increased, and this results in an increase in the size of the generator. Further, the size of the generator tends to be further increased due to the recent advance of the capacity.

It is one of important matters in designing a direct drive wind turbine generator to optimally design a mechanism for supporting a generator, which tends to grow in size. In the direct drive wind turbine generator, two mechanisms are generally used as the generator supporting mechanism.

First, a bearing is provided between the main shaft and the stator casing, and the stator casing is supported by the bearing. The reason why such a mechanism is used is to maintain the size of the gap between the stator and rotor in the generator. In a direct drive wind turbine generator, a deflection occurs in the main shaft due to the gravity acting on the wind turbine rotor provided at the distal end thereof and the gravity acting on itself. Here, the generator rotor coupled to the main shaft is also displaced according to deflection of the main shaft. In order to maintain the size of the gap between the stator and the rotor even in a case that a displacement of the generator rotor occurs, the stator casing is only required to be supported also by the main shaft.

On the other hand, the approach in which the stator casing is supported by a bearing provided on the main shaft cannot support torque acting on the main shaft in the circumferential direction. Especially, when the generator rotor rotates, torque forcing the stator casing to rotate about the main shaft is applied to the stator casing by the attraction force acting between the generator rotor and the stator. Such torque cannot be supported by the bearing provided on the main shaft.

To address this, a mechanism for coupling a static member (typically, a base on which bearings supporting the main shaft are mounted) and the stator casing is provided to support the torque forcing the stator casing to rotate about the main shaft. Such a mechanism is called "torque support" in this description. The torque support is a mechanism which supports torque acting on the stator casing in the circumferential direction of the main shaft to prevent the rotation of the stator casing.

Figure 10:
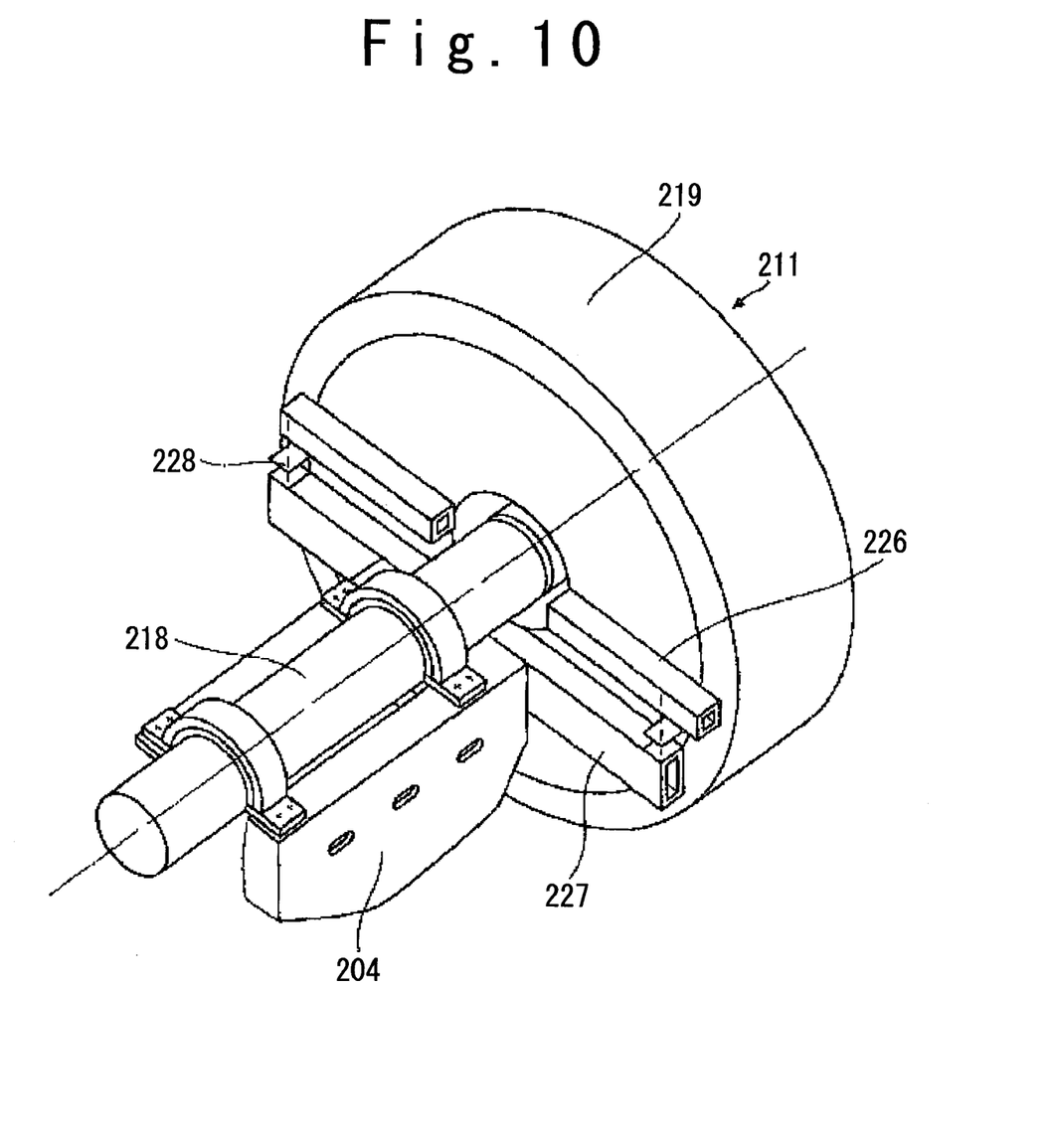
FIG. 10 is a schematic diagram showing the configuration of a torque support of a wind turbine generator in a prior art.

A structure for supporting a generator by the bearings provided on the main shaft and the torque support is disclosed, for example, in Patent Literature 1 (EP1327073B1) and Patent Literature 2 (EP2014917A1). FIG. 10 is a perspective view showing the structure of a wind turbine generator disclosed in the patent literature 1. In the structure shown in FIG. 10, an arm 226, a beam 227, and a damping element 228 are provided on the face of a stator 219, and the beam 227 is attached to a base 204. Such a mechanism functions as a torque support which supports torque forcing the stator 219 to rotate about the main shaft. In addition, bearings 216 and 217 are provided on the main shaft 218, and the stator 219 is also supported by these bearings.

On the other hand, in a wind turbine generator disclosed in the Patent literature 2, the main shaft is supported by first and second bearings provided on a base plate. A stator casing includes a first end plate and a second end plate provided around a rotor, and a casing element. Further, the first end plate is supported by a third bearing provided on the main shaft. The second end plate is attached to a bearing housing by deformable non-rotatable coupling. The non-rotatable coupling functions as a torque support which supports torque forcing the stator casing to rotate about the main shaft.

The inventor is advancing investigations about the generator supporting mechanism, and according to findings obtained by the inventor, one of important matters in designing the torque support is to reduce a bending moment acting on the stator casing (namely, force deflecting the stator casing out of plane). When the stator casing is deformed due to the bending moment acting on the stator casing, the gap between the stator and the rotor cannot be kept constant. This undesirably causes an increase in vibrations of the generator and a degradation of the generator performance. Especially, when the structure of the torque support is improper, a large bending moment undesirably acts on the stator casing. In the structure shown in FIG. 10, for example, the bending moment undesirably acts on the stator casing, since the arm 226 is joined onto the surface of the stator 219. Especially when the output power of the generator is increased, the torque acting on the stator casing in the circumferential direction is also increased and the bending moment is also increased, and this results in that the problem related to the bending moment becomes severe.

One measure to address the problem of the bending moment may be increasing the rigidity of the stator casing to resist against the increase of the bending moment. Such measure, however, undesirably increases the weight of the stator casing increases. Another measure to address the problem of bending moment may be supporting the stator casing as outside as possible. In the structure shown in FIG. 10, for example, the arm 226 and the beam 227 are provided so as to extend to the vicinity of the outer periphery of the stator 219 to thereby support the stator 219. However, the extension of the arm 226 and the beam 227 to the vicinity of the outer periphery undesirably causes size enlargement and weight increase of the arm 226 and the beam 227.

CITATION LIST

Patent Literature

Patent Literature 1: EP1327073B1 (Japanese Translation of PCT No. 2004-511723)
Patent Literature 2: EP2014917A1 (JP2009-19625A)

SUMMARY OF INVENTION

Therefore, an object of the present invention is to provide a supporting structure for reducing the bending moment acting on the stator casing in a wind turbine generator, while reducing the size of the structure member supporting a stator casing.

A wind turbine generator according to the present invention includes a generator which is provided with a stator and a stator casing accommodating a generator rotor and the stator; a main shaft having one end coupled to a wind turbine rotor and the other end coupled to the generator rotor; a first bearing which rotatably supports the main shaft; a second bearing which is provided on the main shaft to support the stator casing such that the main shaft and the stator casing are rotatable relative to each other; a base to which the first bearing is attached; and a torque support including a coupling member which couples the base portion and a front plate of the stator casing. The load center of force acting between the coupling member and the front plate in a case that torque acts on the stator casing in the circumferential direction of the main shaft is positioned in a range between the front and back surfaces of the front plate.

The present invention suppresses the bending moment acting on the front plate of the stator casing, since the torque support is configured such that the load center of the force acting between the coupling member and the front plate is in the range between the front and back surfaces of the front plate. This permits lowering the strength of the stator casing.

When the torque support further includes an insertion member provided for the stator casing, into which member the coupling member is inserted, it is preferable that the insertion member is provided for the stator casing so that a portion thereof is positioned in the stator casing. In one embodiment, the insertion member is inserted into the casing in which the insertion member is provided such that a position of a half of the length of the portion of the insertion member into which the coupling member is inserted falls within the range from the front surface of the casing through which the insertion member is provided to the back surface thereof.

In the above-described wind turbine generator, the insertion member may be formed as a separate member from the casing and attached to the casing. In this case, adaptation to a casing different in size can be achieved by adjusting the size of the insertion member. In addition, manufacture of the casing is facilitated.

In the abovementioned wind turbine generator, the section of the coupling member may be rectangular. This facilitates working and attaching the coupling member. And the load acting on the generator can be supported more appropriately by changing the thickness or the width of the coupling member.

In the abovementioned wind turbine generator, a portion of the base may form the coupling member. This reduces the number of parts and the assembling error, since the coupling member forms a portion of the base.

In the abovementioned wind turbine generator, at least two insertion members may be provided for the casing such that the insertion members and the center of the face of the casing provided with the insertion members are aligned approximately in line. In this case, the load can be supported evenly, and the load acting on the torque support at one position can be reduced.

The abovementioned wind turbine generator may be provided with beams provided on the surface of the casing, and the beams may be provided in both upward and downward directions so as to be approximately orthogonal to a line connecting the insertion member and the center of the surface of the casing on which the insertion member is provided. The use of such a structure increases the rigidity of the casing so that the bearing force against the bending moment can be improved.

In one embodiment, the front plate of the stator casing is configured such that a central portion thereof is provided with a recess and a protruding portion is formed which protrudes from the outer edge of the recess inward in the radial direction of the main shaft. Further, a bearing housing accommodating the first bearing is coupled to the base. A portion of the bearing housing is accommodated in the recess and the protruding portion is fitted into a groove provided for the bearing housing so that the stator casing and the bearing housing are coupled to each other, whereby the torque support is configured by the protruding portion and the bearing housing.

The present invention reduces the bending moment acting on the casing of the generator in the wind turbine generator.

DESCRIPTION OF EMBODIMENTS

Embodiments of a wind turbine generator of the present invention will be explained below referring to the accompanying drawings.

Figure 1:
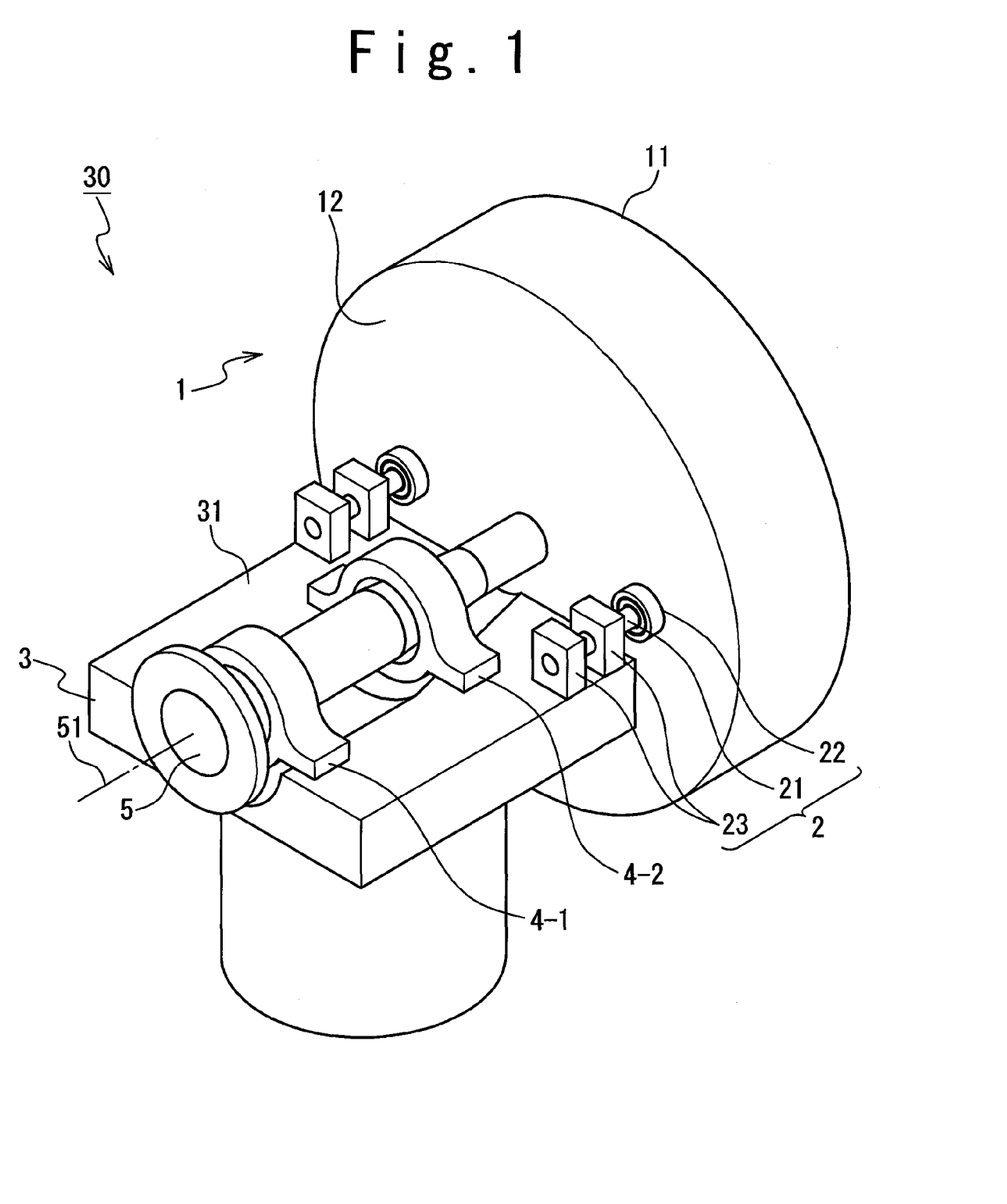
FIG. 1 is a schematic perspective view showing the structure of a wind turbine generator in one embodiment of the present invention.

FIG. 1 is a schematic diagram showing the configuration of a wind turbine generator 30 in one embodiment of the present invention. One end of a main shaft 5 is connected to a wind turbine rotor (not shown), and the other end thereof is connected to a generator 1. Two bearing housings 4-1 and 4-2 are provided on the upper face of a base 3, and the main shaft 5 is rotatably supported by bearings (not shown in FIG. 1) provided in the bearing housings 4-1 and 4-2. Here, the upper face of the base 3 has at least a flat face portion 31. The two bearing housings 4-1 and 4-2 are attached to the upper face of the base 3 such that the central axis 51 of the main shaft 5 is parallel with the flat face portion 31.

Figure 2:
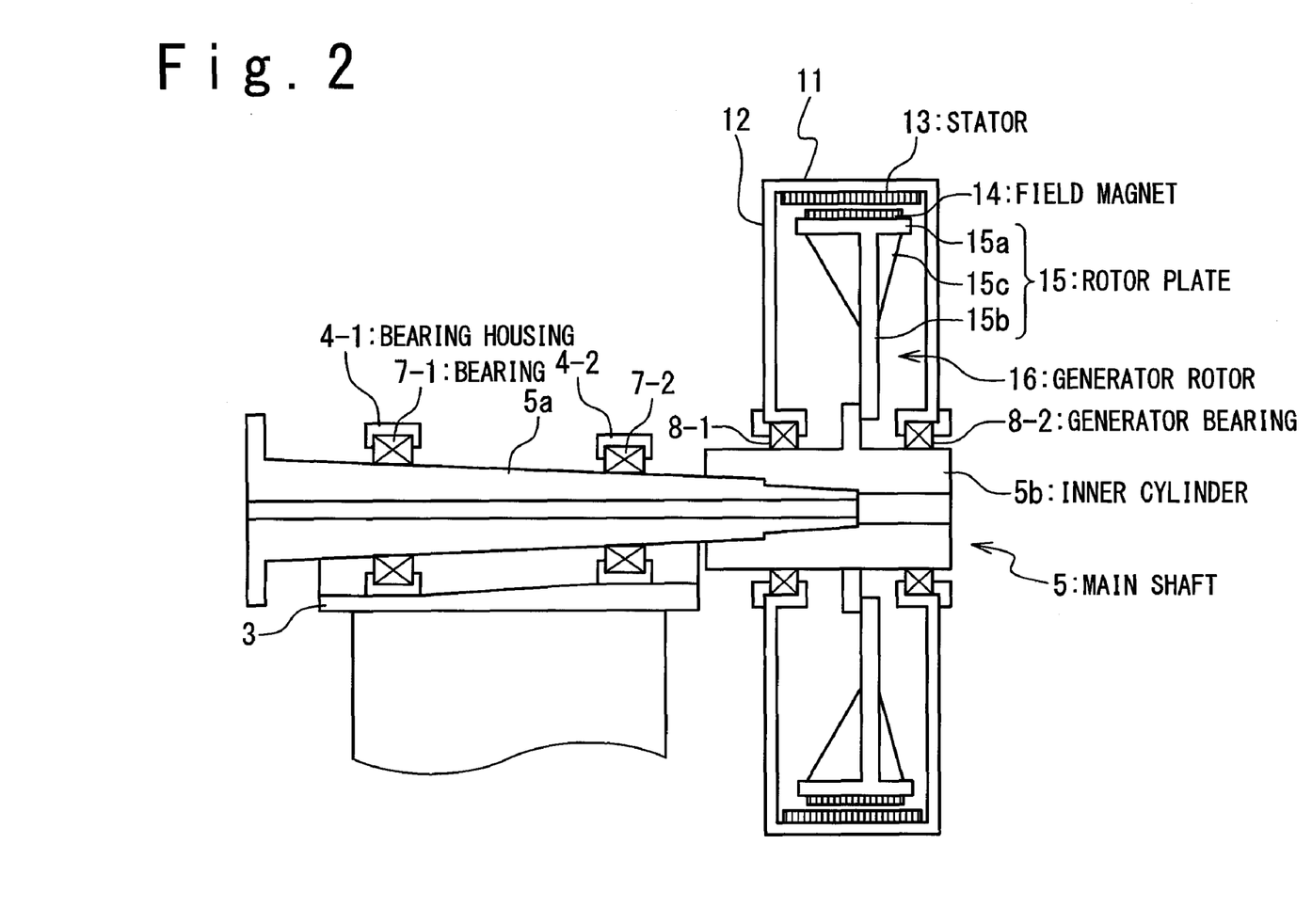
FIG. 2 is a sectional view showing one example of the configuration of a generator.

FIG. 2 is a sectional view showing a connection structure of the generator 1 and the main shaft 5. As shown in FIG. 2, bearings 7-1 and 7-2 are provided in openings of the bearing housings 4-1 and 4-2, and the main shaft 5 is rotatably supported by the bearings 7-1 and 7-2. The main shaft 5 includes a shaft base portion 5a connected to the wind turbine rotor and an inner cylinder 5b into which the shaft base body 5a is inserted, and a generator rotor 16 is joined to the inner cylinder 5b. The generator rotor 16 is provided with a rotor plate 15 made of a plate member(s) or a rod member(s), and field magnets 14 are attached to the outer peripheral portion of the rotor plate 15. A stator 13 is provided outside the field magnets 14 with constant spacing from the field magnets 14, and attached to the inner wall of a stator casing 11. The field magnets 14 must have a certain width for power generation, and the rotor plate 15, which rotates with the field magnets 14 supported thereto, has a recess in the central portion near the main shaft 5 for weight reduction. Specifically, in the structure shown in FIG. 2, the rotor plate 15 is provided with a back plate 15a lining the field magnets 14, a coupling plate 15b coupling the back plate 15a to the inner cylinder 5b, and ribs 15c strengthening the coupling between the back plate 15a and the coupling plate 15b. The width of the ribs 15c in the axial direction of the main shaft 5 is decreased as the distance to the inner cylinder 5b is decreased.

Further, generator bearings 8-1 and 8-2 are provided on inner cylinder 5a, and the stator casing 11 is supported by these generator bearings 8-1 and 8-2. As discussed above, to support the stator casing 11 with the generator bearings 8-1 and 8-2 provided on the main shaft 5 is important for keeping the distance constant between the field magnets 14 of the generator rotor 16 and the stator 13.

Here, the torque acting on the stator casing 11 in the circumferential direction of the main shaft 5 cannot be supported by the generator bearings 8-1 and 8-2 provided on the main shaft 5, as described above. Therefore, as shown in FIG. 1, in this embodiment, the torque supports 2 are mounted on the flat face portion 31 at respective end portions of the base 3 on both of the left and right across the central axis 51 beside the generator 1, so that the torque acting on the stator casing 11 in the circumferential direction of the main shaft 5 is supported by the torque supports 2.

As described below, one of features of the wind turbine generator of this embodiment lies in the connection structure of the torque supports 2 and the stator casing 11. The connection structure of the torque supports 2 and the stator casing 11 will be explained below in detail.

Figure 3A:
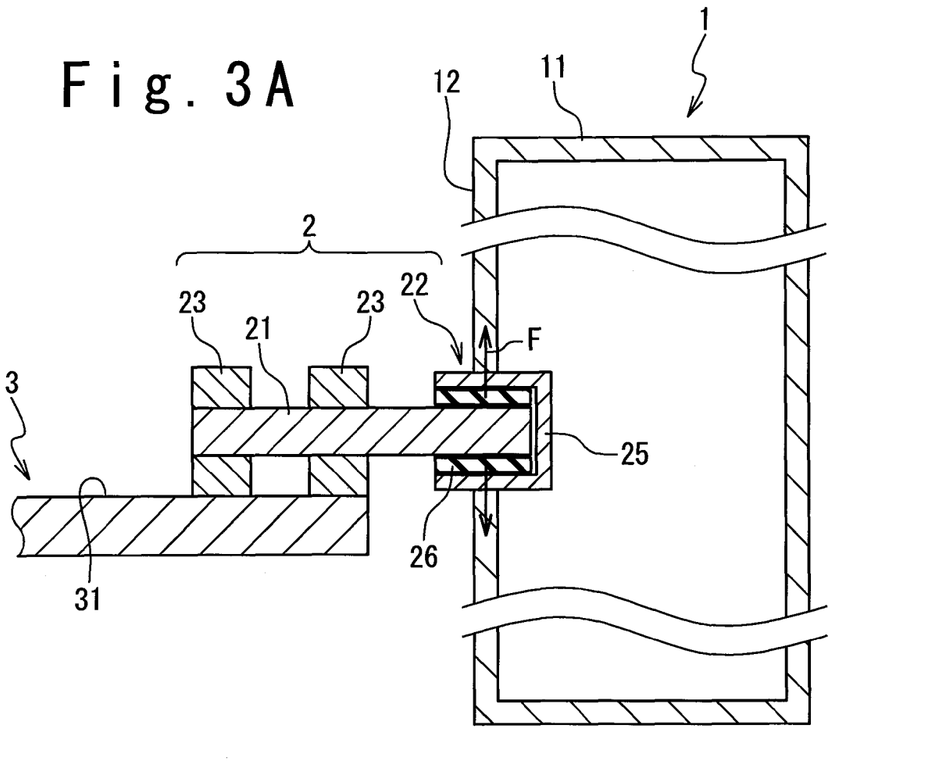
FIG. 3A is a sectional view showing the configuration of a torque support in one embodiment of the present invention.
Figure 3B:
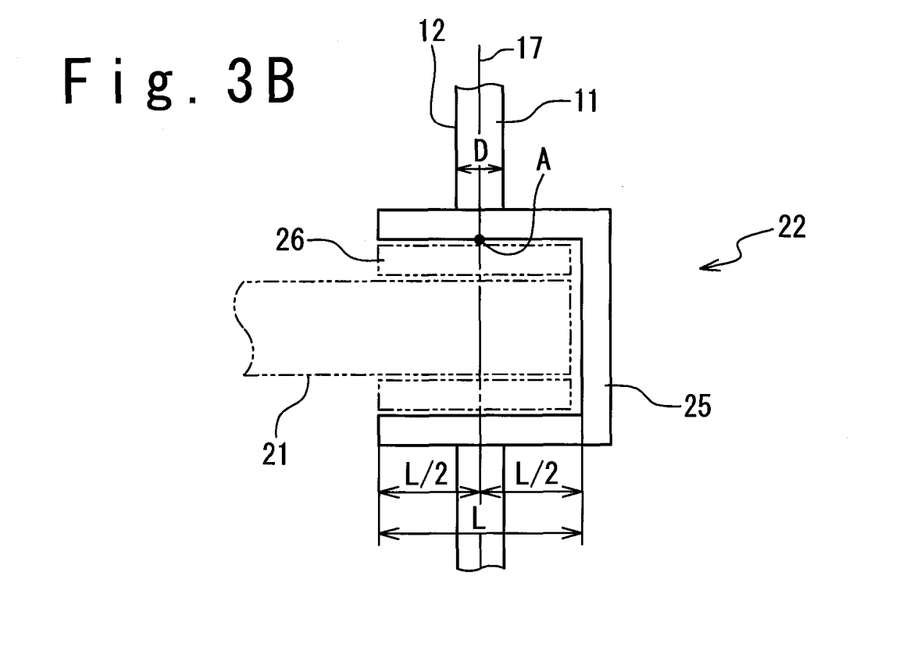
FIG. 3B is a sectional view showing the configuration the torque support in one embodiment of the present invention.

FIGS. 3A and 3B are sectional views showing the structure of the torque supports 2. The torque supports 2 are each provided with a pin 21, two brackets 23, and an insertion member 22. In the torque supports 2, the brackets 23 are attached to the right end portion on the flat face portion 31 beside the generator 1, arrayed in parallel to the central axis 51 of the main shaft 5. The pin 21 is a coupling member coupling the insertion member 22 and the brackets 23. The pin 21 is directed from the base 3 to the generator 1 and attached in parallel to the central axis 51 of the main shaft 5 so that one end thereof inserted into the brackets 23 to be fixed and the other end thereof is inserted into the insertion member 22 to be fixed. The insertion member 22 is provided such that a portion thereof is inserted through the front plate 12 of the stator casing 11 of the generator 1. As described later, this is important for the torque supports 2 to reduce the bending moment acting on the stator casing 11.

The insertion member 22 includes a bush case 25 and a vibration-isolating rubber 26 provided in the bush case 25. The vibration-isolating rubber 26 is structured to accommodate the pin 21 therein, and functions as a shock-absorbing member made of elastic material absorbing the torque reaction force acting on the pin 21. A portion of the bush case 25 is inserted inside the stator casing 11 from the front plate 12.

The positions of the insertion members 22 is one of design parameters influencing the required size of the base 3 and the magnitude of torque which can be supported by the torque supports 2. It is preferable that the insertion members 22 are provided at positions spaced from the center of the front plate 12 of the stator casing 11 outwardly in the radial directions by a distance of ½ to ¾ of the radius of the front plate 12. This is because positioning the insertion members 22 excessively close to the vicinity of the outer circumference of the stator casing 11 causes the base 3 to be excessively large and makes it difficult to mount the insertion members 22 because of the interference with the position of the stator 13 and the field magnets 14 of the generator 1. In this embodiment, in which the rotor plate 15 has a recess at the central portion near the main shaft 5 as described above, positioning the insertion members 22 at the position spaced from the center of the front plate 12 of the stator casing 11 outwardly in the radial directions by a distance of ½ to ¾ of the radius of the front plate 12 prevents the insertion members 22 from interfering with the stator 13, the field magnets 14, and the rotor plate 15, even when the insertion members 22 are inserted into the stator casing 11 from the front plate 12 positioned beside the base 3. When the insertion members 22 are positioned excessively close to the center of the stator casing 11, on the other hand, the insertion members 22 cannot support the torque acting on the stator casing 11. It is also preferable that the two insertion members 22 provided on left and right, and the center (not shown) of the circular front plate 12 are aligned in line.

In this embodiment, the coupling structure of the torque supports 2 and the stator casing 11 is designed such that the load center of the force which the torque support 2 acts on the front plate 12 of the stator casing 11 falls within the range of a thickness D of the front plate 12 (namely, within the range between the front and back surfaces). More specifically, the insertion members 22 are provided at such positions that the insertion members 22 are inserted into the stator casing 11 from the front plate 12 of the stator casing 11 and the depth of insertion of the pins 21 in the insertion members 22 is properly adjusted, so that the load center falls within the range of the thickness D of the front plate 12. A description is given of an advantage of such structure, with a comparison of a comparative example shown in FIG. 4A with the embodiment shown in FIG. 4B.

Figure 4A:
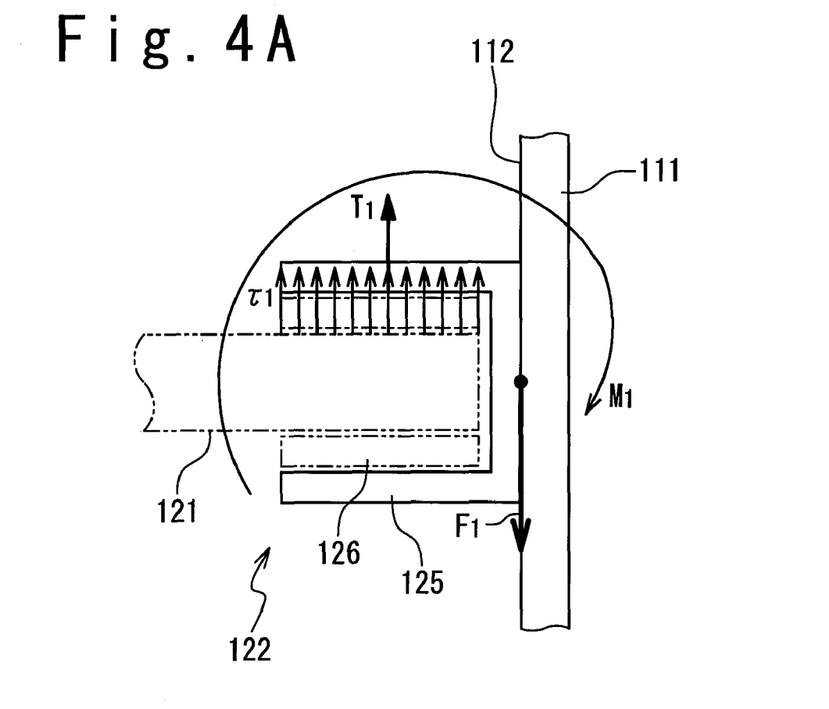
FIG. 4A is a schematic diagram showing the configuration of a torque support in a comparative example.

FIG. 4A is a schematic diagram showing a coupling structure of a torque support 2 and a stator casing for a case that the abovementioned insertion portion is assumed to be provided on the surface of the front plate. That is, as shown in FIG. 4A, such a case is considered that a torque support is provided with a pin 121 and an insertion member 122, one end of the pin 121 is inserted in the insertion member 122, and the insertion member 122 is provided on a front plate 112 of a stator casing 111. Here, the insertion member 122 includes a bush case 125 and a vibration-isolating rubber 126 provided in the bush case 125, as is the case of the insertion members 122 of this embodiment.

In this case, torque is applied to the stator casing 111 in the circumferential direction of the main shaft (not shown), when the generator rotor (not shown) is rotated. The force corresponding to this torque is illustrated as force F1 in FIG. 4A. When the torque is applied to the stator casing 111 in the circumferential direction, the force against the torque is imparted to the insertion member 122 by the pin 121 so that the rotation of the stator casing 111 is prevented. At this time, loads τ1 are applied to the insertion member 122 from a portion of the pin 121 inserted into the insertion member 122. It can be considered that a load T1 acts on the vicinity of the central portion of the region on which loads τ1 act, with the magnitude of the sum of loads τ1. The force F1 and the load T1 are balanced with respect to the circumferential direction of the main shaft, so that the stator casing 111 is prevented from rotating in the circumferential direction.

At this time, however, the position where the load T1 acts, namely, the load center is positioned out of the range of the thickness of the stator casing 111 so that the bending moment M1 due to the load T1 acts on the stator casing 111, since the insertion member 122 protrudes from the front plate 112 of the stator casing 111. As a result, an out-of-plane deformation, such as strain and deflection, occurs in the stator casing 111 due to the bending moment M1. As a result, the gap between the generator rotor and the stator becomes uneven, which results in generation of additional vibrations. This may make it difficult to achieve stable operation of the generator.

Figure 4B:
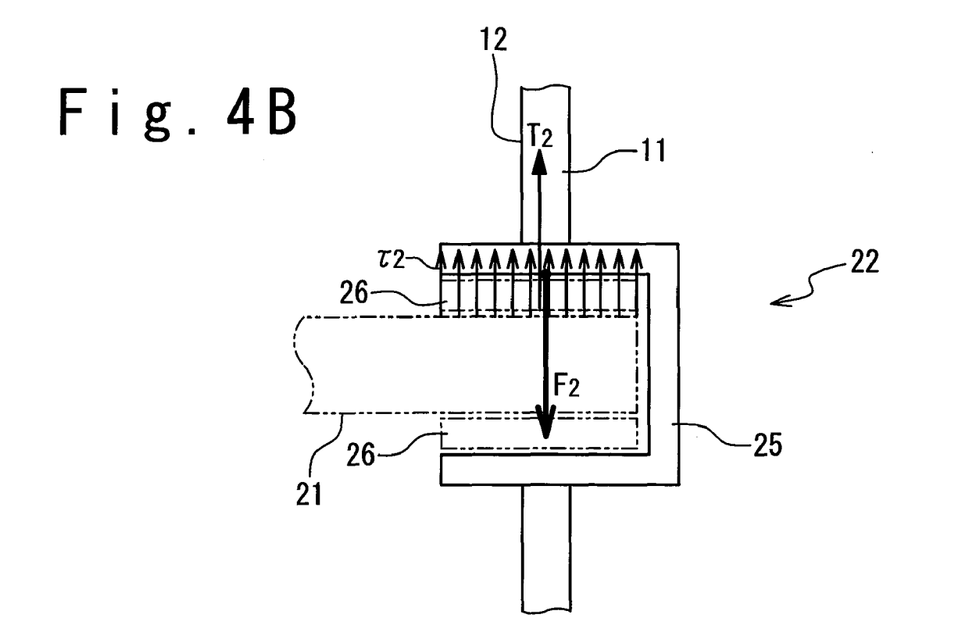
FIG. 4B is a schematic diagram showing the configuration of a torque support in one embodiment of the present invention.

In this embodiment, on the other hand, the connection structure between the torque support 2 and the stator casing 111 is designed, so that the position where the load T1 acts on the stator casing 111 from the pin 21, namely, the load center falls within the range of the thickness D of the stator casing 11 (namely, within the range between the front surface and the back surface) to reduce the bending moment acting on the stator casing 11, as shown in FIG. 4B. Specifically, when the main shaft 5 rotates, torque acts on the stator casing 11 in the circumferential direction in this embodiment, while the force against the torque is imparted to the insertion member 22 by the pin 21 so that the rotation of the stator casing 11 is prevented in the same manner as the first embodiment. In FIG. 4B, the force corresponding to the torque acting on the stator casing 11 in the circumferential direction is illustrated as force F2. At this time, loads τ2 act between the pin 21 and the insertion member 22. It can be considered that a load T2 acts on the vicinity of the center of the region on which the loads τ2 act, with a magnitude of the sum of the loads τ2. By balancing of the force F2 and the load T2 acting on the main shaft 5 regarding the circumferential direction of the main shaft 5, the stator casing 11 is prevented from rotating in the circumferential direction.

At this time, in this embodiment, a portion of the insertion member 22 is inserted into the stator casing 11 from the front plate 12 of the stator casing 11, so that the position where the load T2 acts, namely, the position of the load center is adjusted to fall within the range of the thickness of the stator casing. 11. In such a structure, the bending moment due to the load T2 does not act on the stator casing 11. Therefore, the structure of the torque support 2 of this embodiment reduces the in-plane moment acting on the stator casing 11.

The position where the load T2 acts, namely, the position of the load center can be adjusted by the insertion depth of the pin 21 into the insertion member 22. That is, the insertion depth of the pin 21 into the insertion member 22 is adjusted such that the load center of the force acting between the pin 21 and the insertion member 22 for the case that the torque acts on the stator casing 11 in the circumferential direction of the main shaft 5 falls within the range of the thickness D of the stator casing (namely, within the range between the surface and the back surface). In one embodiment, as shown in FIG. 3B, it is preferable that the insertion member 22 is inserted into the stator casing 11 up to such a position that the position A of the half of the length L of the portion of the pin 21 inserted into the insertion member 22 falls within the range of the thickness D of the stator casing 11. It is further preferable that the position A is closer to the center line 17 of the thickness D of the stator casing 11, and it is ideally preferable that the position A approximately coincides with the center line 17.

As thus described, the connection structure between the torque support 2 and the stator casing 11 of this embodiment allows the position where the load T2 acts, namely, the load center to be positioned inside the thickness of the stator casing 11. Thereby, the bending moment acting on the stator casing 11 can be suppressed.

The suppression of the bending moment acting on the stator casing 11 is also advantageous for the size reduction of the base 3. When the bending moment acting on the stator casing 11 cannot be reduced, it is required to arrange the supporting positions of the stator casing 11 closer to the outside of the stator casing 11. This undesirably increases the size of the base 3 or a structure member which is coupled to support the stator casing 11. In this embodiment, on the other hand, the positions where the insertion members 22 are provided are allowed to be closer to the center of the front plate 12 of the stator casing 11, since the bending moment acting on the stator casing 11 is suppressed. This is advantageous for the size reduction of the base 3.

It should be noted that the present invention is not limited to the abovementioned embodiments and it is apparent that embodiments may be properly changed or modified within the scope of the present invention. For example, the present invention may be variously modified as described below.

Figure 5:
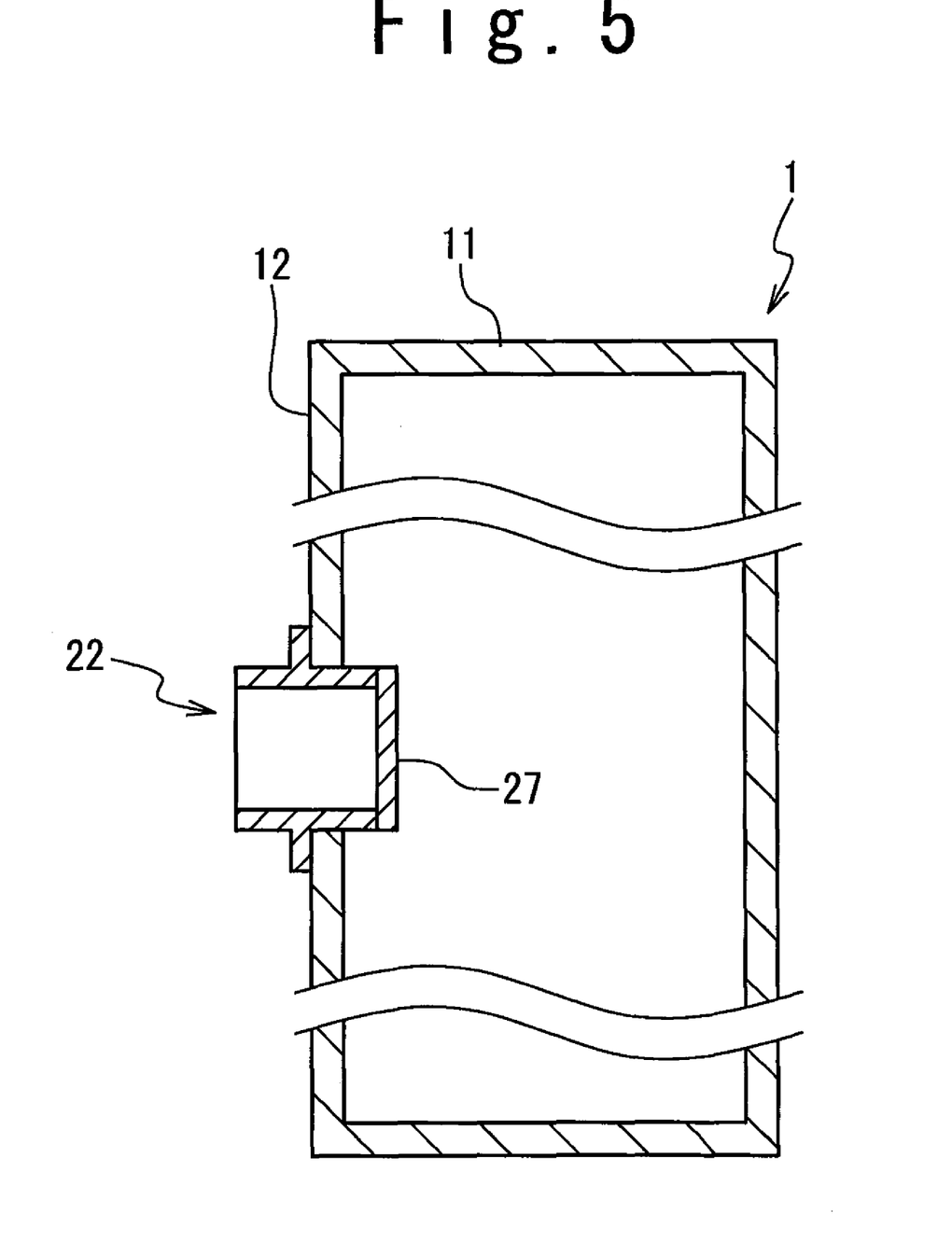
FIG. 5 is a schematic diagram showing the configuration of a torque support in another embodiment of the present invention.

FIG. 5 is a schematic diagram showing the configuration of the insertion member 22 of the torque support 2 in another embodiment of the present invention. As shown in FIG. 5, the bush case 27 of the insertion member 22 may be provided as separately from the stator casing 11 and attached to the stator casing 11 by a fastening member such as bolts (not shown) in a state that the bush case 27 is at least partially inserted into the stator casing 11. It is advantageous that the bush case 27 is manufactured separately from the stator casing 11, since the manufacture is facilitated and pins of various shapes can be accommodated by only changing the shape of the bush case 27.

Figures 6A, 6B:
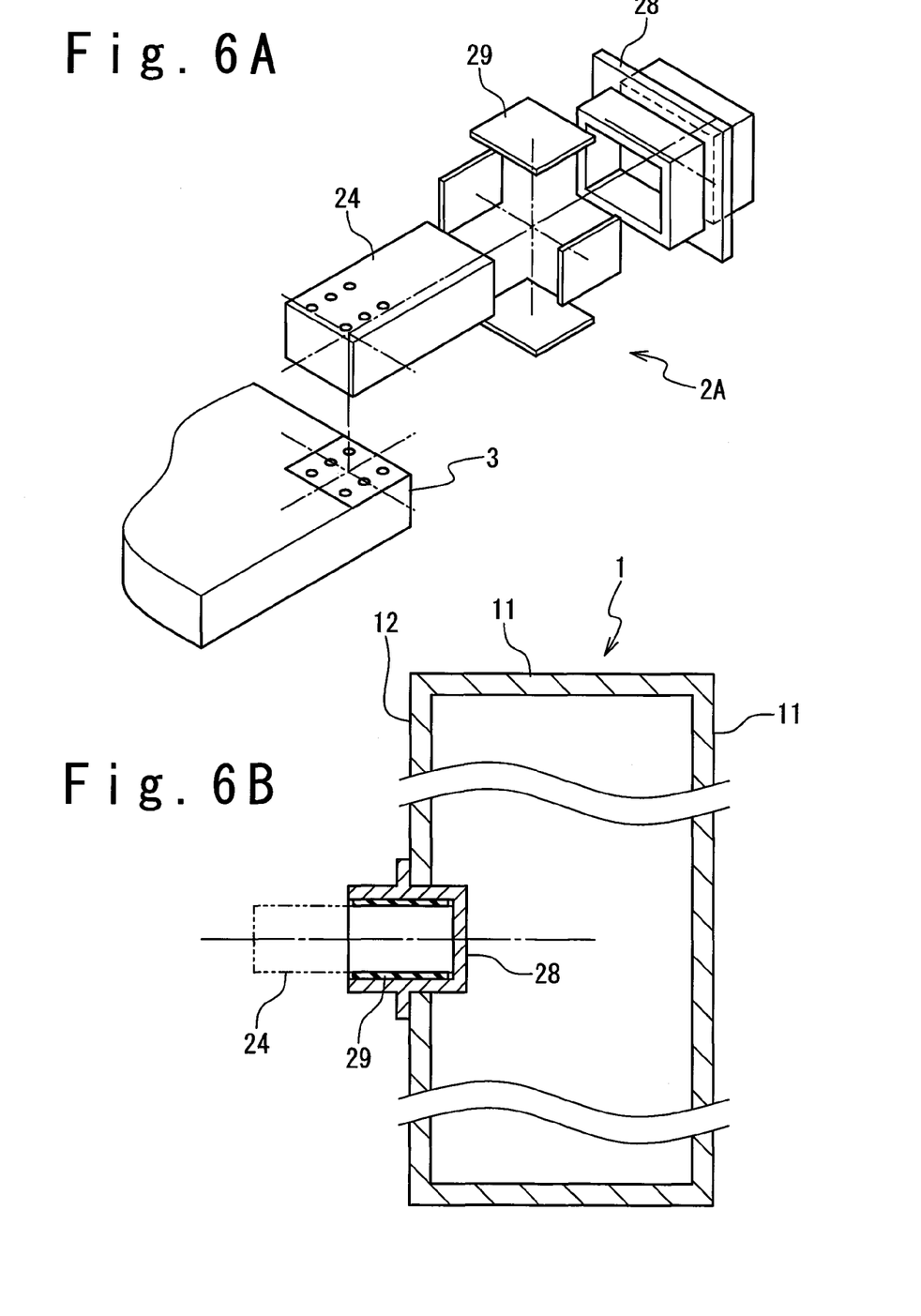
FIG. 6A is a schematic diagram showing the configuration of a torque support in still another embodiment of the present invention.
FIG. 6B is a sectional view showing the configuration of the torque support shown in FIG. 6A.

FIGS. 6A and 6B are schematic diagrams showing the configuration of a torque support 2A in still another embodiment of the present invention. The torque support 2A is provided with a pin 24, a bush case 28 and vibration-isolating rubbers 29. The pin 24 is formed in a rectangular bar shape, and one end thereof is attached to left and right both end portions of the base 3 on the side of the generator 1 by bolts (not shown), for example. On the other hand, the other end of the pin 24 is attached with the vibration-isolating rubbers 29 and inserted into the bush case 28. A portion of the bush case 28 is inserted into the stator casing 11 from the front plate 12 positioned beside the base 3 of the stator casing 11 and attached to the stator casing 11. Here, the vibration-isolating rubbers 29 may be attached over the whole circumference of the pin 24 as shown in FIG. 6A, or the vibration-isolating rubbers 29 may be attached to only the upper and lower faces of the pin 24.

Figure 7:
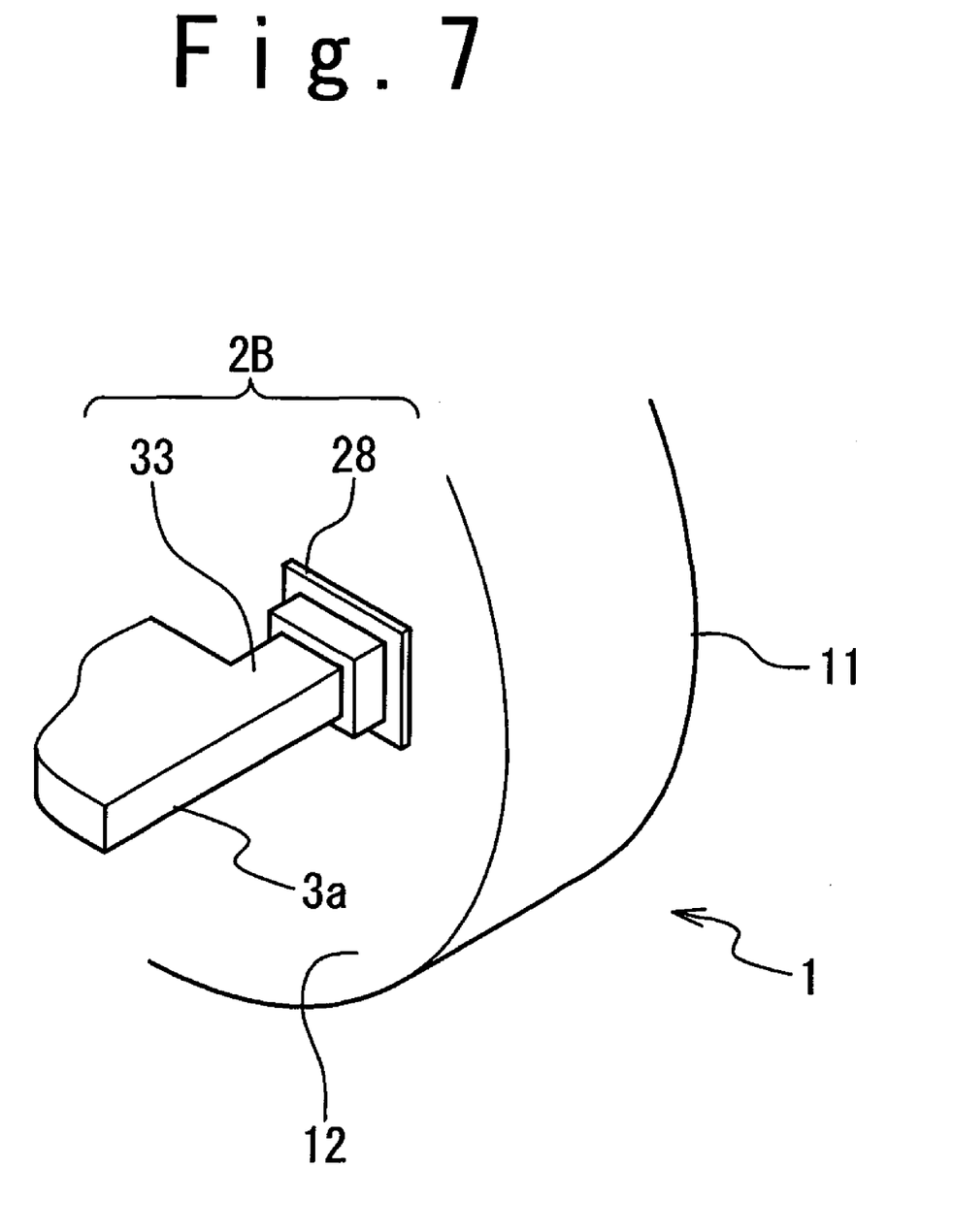
FIG. 7 is a schematic diagram showing the configuration of a torque support in still another embodiment of the present invention.

FIG. 7 is a schematic diagram showing the configuration of torque supports 2B in still another embodiment of the present invention. The torque supports 2B are configured such that pins 33 are integrated to the base 3a as one unit; both of left and right end portions of the base 3a positioned beside the generator 1 are protruded as the pins 33 in the direction towards the generator 1. The end portions of the pins 33 of the base 3a are inserted into the bush cases 28. The bush cases 28 are attached to the front plate 12 of the stator casing 11 beside the base 3a. Here, vibration-isolating rubbers (not shown) are attached to the end portion of the pins 33, and the bush cases 28 are at least partially inserted into the stator casing 11 to be attached thereto, as is the case of other embodiments. Such a structure reduces the number of parts and the assembling error, since the base 3a and the pins 33 of the torque supports 2B are integrated in one unit.

Here, it is preferable that the bush cases 28 are provided on the front plate 12 such that the bush cases 28 positioned on the left and right and the center (not shown) of the front plate 12 are aligned in line. Therefore, the bush cases 28 on the left and right, into which the pins 33 which are portions of the base portions 3a are inserted, may be inserted into a member of the front plate 12, so that the bush cases 28 and the center (not shown) of the front plate 12 are aligned in line, while a groove or a recess is formed on the upper face (not shown) of the base 3a to receive the main shaft (not shown) therein.

Figure 8A:
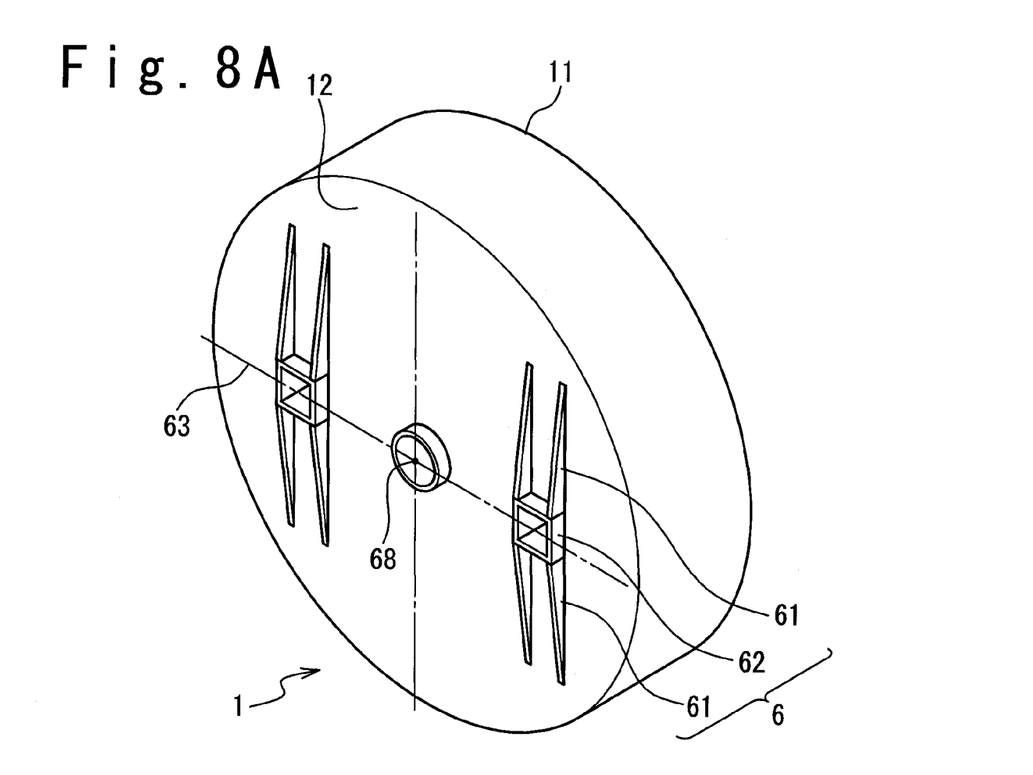
FIG. 8A is a schematic diagram showing the configuration of a torque support in still another embodiment of the present invention.

FIGS. 8A and 8B are schematic diagrams showing the configuration of torque supports in still another embodiment of the present invention. As shown in FIG. 8A, insertion members 62 are provided at two positions on the front plate 12 of the stator casing 11 of the generator 1 beside the base 3.

Here, it is preferable that the insertion members 62 are provided so that the right and left insertion members 62 and the center 68 of the front plate 12 are aligned in line on the straight line 63, as is the case of other insertion members. It is also preferable that the insertion members 62 are provided at positions spaced by a distance of approximately half of the radius from the center 68 of the front plate 12 in the horizontal direction.

Beams 61 are provided on the surface of the front plate 12. The beams 61 are attached in both of the upward and downward directions of the insertion members 62 so as to be approximately orthogonal to the straight line 63 connecting the two insertion members 62 at the right and left positions and the center (not shown) of the front plate 12. The length of the beams 61 is a half of the length to the side face of the generator 1, namely, the length corresponding to a half of the bow at the attaching portions of the beams 61, and the shape thereof is formed such that the height thereof is highest in the vicinity (on the sides of the connections with the insertion members 62) of the center of the front plate 12, gradually becoming lower toward the outer periphery of the front plate 12.

Figure 8B:
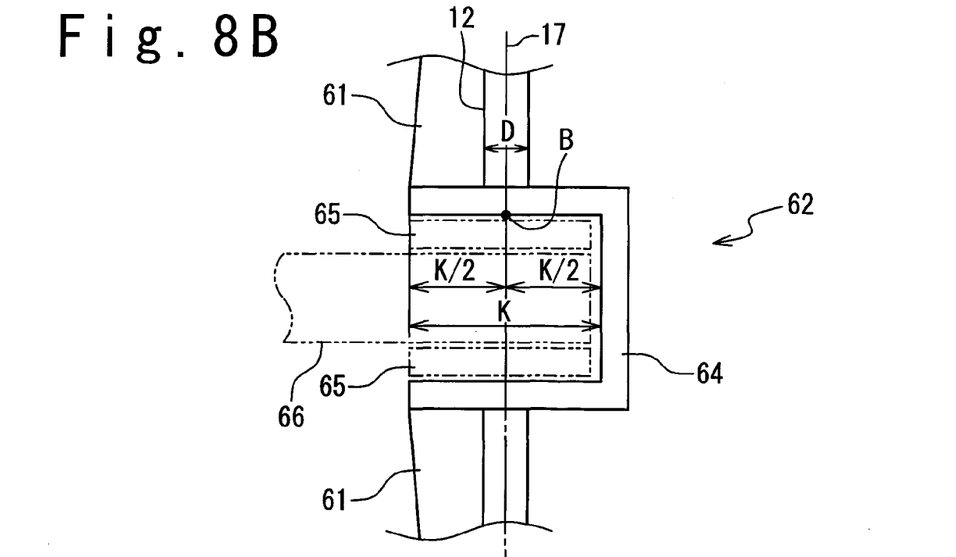
FIG. 8B is a sectional view showing the configuration of the torque support shown in FIG. 8A.

As shown in FIG. 8B, the abovementioned bush cases 64 and the vibration-isolating rubbers 65 may be used as the insertion members 62. Further, the above-mentioned pins, portions of the base, or the like may be used as the pins 66 to be inserted into the insertion members 62. The insertion members 62 are provided such that at least a portion thereof is inserted into the stator casing 11 from the front plate 12 of the stator casing 11 beside the base 3. Here, it is preferable that the insertion members 62 are inserted up to such a position that the positions B of half of the length K of the portions of the insertion members 62 into which portions the pins of the torque supports are inserted fall within the range of the thickness D of the member of the front plate 12.

Here, it is further preferable that the positions B are closer to the center line 17 of the thickness D of the member for the front plate 12, and it is ideally preferable that the positions B approximately coincide with the center line 17. This is because the torque due to the generator 1 acting on the pin of the torque support is allowed to be transmitted into the front plate 12.

As thus described, the rigidity of the stator casing 11 can be raised by providing the beams 61 on the front plate 12 so as to support the insertion members 62 from above and below. This improves the resistance force against the bending moment.

Figure 9A:
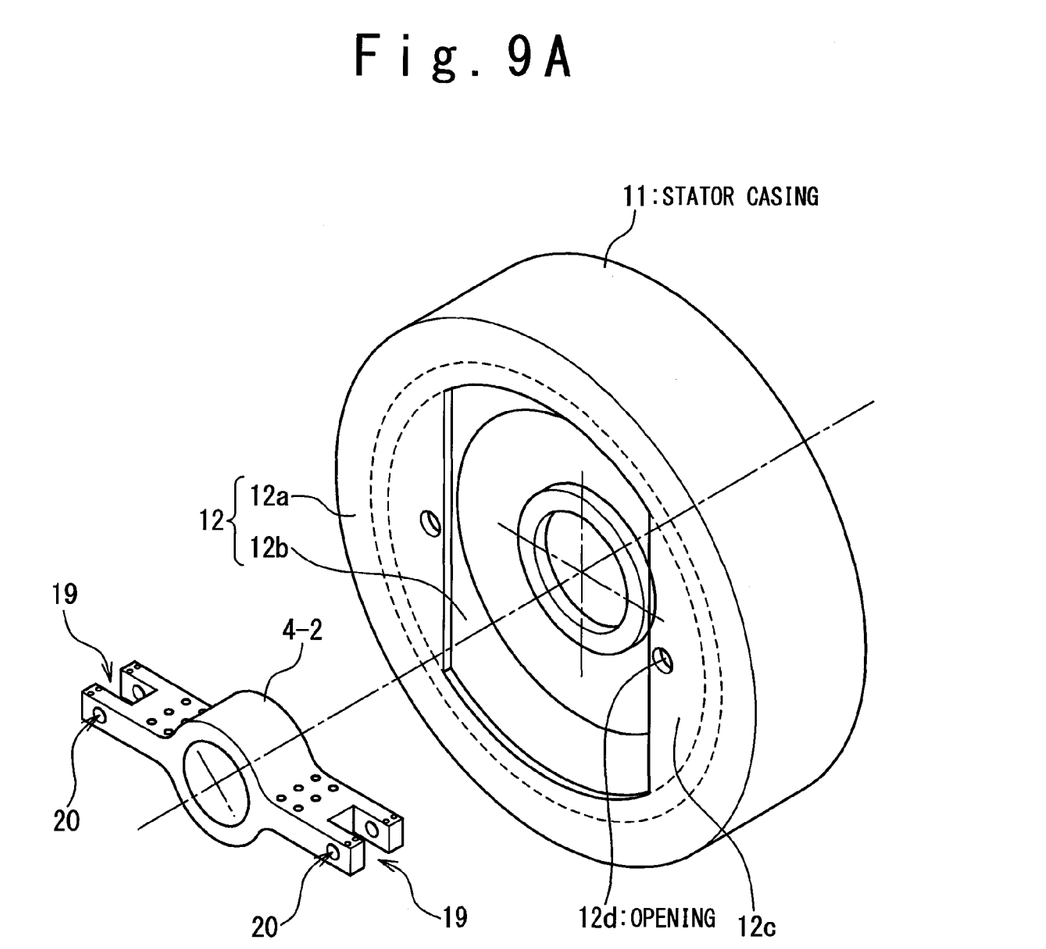
FIG. 9A is a schematic diagram showing the configuration of a torque support in still another embodiment of the present invention.
Figure 9B:
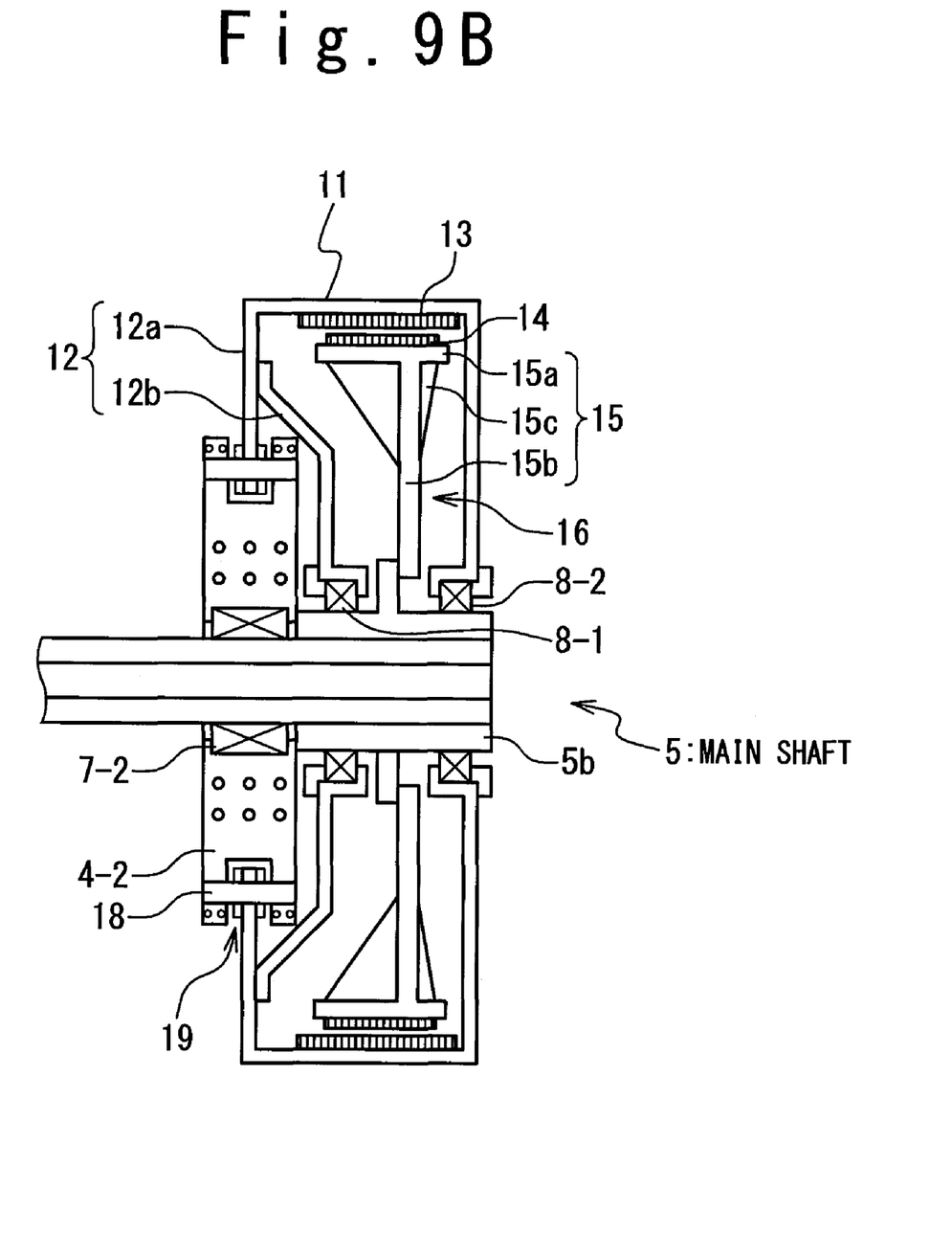
FIG. 9B is a sectional view showing the configuration of the torque support shown in FIG. 9A.

FIGS. 9A and 9B are diagrams showing a connection structure between the torque supports and the stator casing in still another embodiment of the present invention. FIG. 9A is a perspective view showing the connection structure between the torque support and the stator casing, and FIG. 9B is a sectional view of the connection structure viewed from the above.

In the structure shown in FIGS. 9A and 9B, a recess is provided for the front plate 12 of the stator casing 11, and a portion of the bearing housing 4-2 is accommodated in the recess. Specifically, the front plate 12 includes an outer peripheral portion plate 12a and a central portion plate 12b. The outer peripheral portion plate 12a is coupled to the outer edge portion of the central portion plate 12b. The central portion plate 12b is formed such that the central portion thereof is recessed with respect to the outer edge portion.

In addition, portions of the outer peripheral portion plate 12a are protruded from the coupling position with the central portion plate 12b inwardly in the radial direction, and these protruding portions (the protruding portions 12c) are fitted into grooves 19 provided for the bearing stand 4-2 to support the stator casing 11. That is, in this embodiment, the torque supports include the bearing stand 4-2, the protruding portions 12c of the front plate 12 of the stator casing 11. Specifically, the bearing stand 4-2 illustrated in FIG. 9A is formed with the grooves 19 and openings 20 formed to go through in the axial direction of the main shaft 5 so as to cross the grooves 19. On the other hand, the protruding portions 12c of the outer peripheral portion plate 12a are formed with openings 12d. Bushes 18 are inserted into the openings 20 of the bearing stand 4-2 in a state that the protruding portions 12c of the outer peripheral portion plate 12a are fitted in the grooves 19 provided for the bearing stand 4-2. The bushes 18 are inserted to go through the openings 20 provided through the bearing stand 4-2 and the openings 12d provided thorough the protruding portions 12c of the outer peripheral portion plate 12a. Thereby, the stator casing 11 is fixed to the bearing stand 4-2.

It should be noted that the load center of the force which the torque support acts on the front plate 12 of the stator casing 11 is designed to fall within the range of the thickness D of the front plate 12 (namely, within the range between the front surface and the back surface), in the structure shown in FIGS. 9A and 9B. In FIGS. 9A and 9B, the protruding portions 12c are fitted into the grooves 19 provided for the bearing stand 4-2 to fix the stator casing 11. Since the protruding portions 12c are protruded from the coupling position with the central portion plate 12b inwardly in the radial direction, force acts on the front plate 12 only in the in-plane direction of the front plate 12 even when torque acts on the stator casing 11 in the circumferential direction of the main shaft 5. Therefore, the structure shown in FIGS. 9A and 9B reduces the bending moment acting on the stator casing 11.

Although various embodiments of the present invention are described above, the shapes of the pins of the torque support may be different than the cylindrical shape or the rectangular shape in each embodiment. Further, the torque support and insertion member may be integrated as one unit with the base and the flat plate of the stator casing beside the base, respectively, or may be members separated therefrom. It would be obvious that the present invention may be applied to combinations of such a configuration that the torque support is cylindrical and integrated with the base, such a configuration that the insertion member is a member separated from the flat plate of the stator casing positioned adjacent to the base, and the like.

Further, although direct drive wind turbine generators are described in the above-mentioned embodiments, the present invention may be also applied to a wind turbine generator which is not of the direct drive type. It should be noted, however, that it is most preferable that the present invention is applied to a direct drive wind turbine generator in which a large size generator is used.

The invention claimed is:

1. A wind turbine generator, comprising:
    a generator including a stator and a stator casing accommodating a generator rotor and the stator;
    a main shaft having one end coupled to a wind turbine rotor and the other end coupled to the generator rotor;
    a first bearing rotatably supporting said main shaft;
    a second bearing provided on said main shaft to support said stator casing such that said main shaft and said stator casing are rotatable with respect to each other;
    a base to which said first bearing is attached; and
    a torque support including a coupling member which couples said base portion and a front plate of said stator casing,
    wherein a load center of a force acting between said coupling member and said front plate in a case that torque acts on said stator casing in a circumferential direction of said main shaft is positioned in a range between front and back surfaces of said front plate.

2. The wind turbine generator according to claim 1, wherein said torque support further comprises at least one insertion member provided for said stator casing, into which said coupling member is inserted, and
    wherein said insertion member is provided for said stator casing so that a portion of said insertion member is positioned inside said stator member.

3. The wind turbine generator according to claim 2, wherein said insertion member is inserted into said stator casing so that a position of a half of a length of a portion of said insertion member, into which portion said coupling member is inserted, is in a range between front and back surfaces of said stator casing.

4. The wind turbine generator according to claim 2,
    wherein said insertion member is formed as a separate unit from said stator casing and attached to said casing.

5. The wind turbine generator according to claim 2, wherein a section of said coupling member is rectangular.

6. The wind turbine generator according to claim 2, wherein a portion of said base forms said coupling member.

7. The wind turbine generator according to claim 2, further comprising another said insertion member,
    wherein said two insertion members are inserted into said stator casing so that said two insertion members and a center of a face of said stator casing into which face said two insertion members are inserted are substantially aligned in line.

8. The wind turbine generator according to claim 2, further comprising: beams provided on a front surface of said stator casing,
    wherein said beams are provided to extend upward and downward from said insertion member substantially perpendicularly to a line connecting said insertion member and a center of a face said stator casing, into which face said insertion member is inserted.

9. The wind turbine generator according to claim 1, further comprising: a bearing housing coupled to accommodate said first bearing,
    wherein said front plate of said stator casing has a recess portion at a center thereof, and is structured to include a protruding portion protruding inward in a radial direction of said main shaft from an outer edge of said recess portion, and
    wherein a portion of said bearing housing is accommodated in said recess portion and said protruding portion is fitted into a groove provided for said bearing housing, whereby said torque support is constituted form said protruding portion and said bearing housing.

* * * * *